Patented Oct. 8, 1935

2,016,490

UNITED STATES PATENT OFFICE 2,016,490

PRODUCTION OF MIXED POLYMERIZATION PRODUCTS FROM VINYL ETHERS

Hans Fikentscher, Ludwigshafen-on-the-Rhine, Germany, assignor to I. G. Farbenindustrie Aktiengesellschaft, Frankfort - on - the - Main, Germany No Drawing. Application November 9, 1931, Serial No. 574,035. In Germany November 12, 1930

13 Claims. (Cl. 260—2)

The present invention relates to the production of polymerization products.

Vinyl ethers could be hitherto polymerized to solid and useful high molecular products giving solutions of high viscosity neither by light nor by heat nor with the aid of polymerization accelerators.

I have now found that valuable, high molecular from rubber-like to hard elastic but non-extensible polymerization products can be obtained from vinyl ethers by carrying out the polymerization in conjunction with neutral, polymerizable organic compounds containing an aliphatic double linkage. By the term neutral I wish to exclude acid polymerizable organic compounds, such as acrylic acid, which cannot be employed owing to the sensitivity of the vinyl ethers against acids.

The polymerization is carried out in the usual manner, as for example directly with the mixtures of the said compounds or with aqueous emulsions thereof, if desired in the presence of diluents, such as water and/or organic solvents, and/or of oxygen, or agents capable of splitting off oxygen such as inorganic or organic peroxides or also boron fluoride. Especially when polymerizing in the presence of water it is preferable to exclude any acids or even to add a small quantity of an alkaline agent, the polymerization being preferably carried out in weakly alkaline media such as those having a hydrogen-ion concentration of from 7 to about 8.

As vinyl ethers may be mentioned especially those of saturated aliphatic open chain or cycloaliphatic alcohols, as for example methyl, ethyl, propyl and butyl ethers of vinyl alcohol, those of saturated alkyl ethers of glycols such as of ethylene, propylene or butylene glycols, and also those of aromatic alcohols, as for example the benzyl ether, those of hydroaromatic alcohols, as for example the cyclohexyl ether and mixtures of the said vinyl ethers.

Suitable neutral, polymerizable organic compounds to be polymerized in conjunction with the vinyl ethers and having one aliphatic double linkage are for example vinyl esters, as for example vinyl chloride, vinyl acetate, vinyl chloroacetate, and styrene or its homologues, such as methyl styrene, vinyl chlorbenzene, acrylic nitrile, acrylic amide and anilide, acrylic esters, such as methyl, ethyl, propyl, butyl or benzyl esters, and similar neutral polymerizable compounds. The quantities of the said neutral, polymerizable organic compounds employed are generally between 100 and 600 per cent by weight of the vinyl ether depending on the properties of the final product desired, preferably between 100 and 400 per cent.

The polymerization can be carried out if desired in the presence of solvents or diluents such as benzene, toluene, xylene, methylene chloride, chlorbenzene, dioxane, aliphatic ketones, such as acetone or methyl ethyl ketone, or like inert organic solvents which are not capable of forming acids during the reaction, or mixtures thereof, or in water or aqueous from neutral to weakly alkaline solutions in which latter case the polymerization is carried out with an emulsion. The polymerization may be carried out by warming to from 35° to 150° C. depending on the boiling points of the initial materials preferably between 50° and 100° C. The reaction may be accelerated by the action of light or by adding oxygen either as such or in the form of peroxides such as hydrogen peroxide, alkali metal peroxides or perborates, barium peroxide, acetyl or benzoyl peroxides, acetone peroxide or the like. If the peroxides are capable of forming strong acids they should be employed in conjunction with a corresponding quantity of alkali in order to keep the reaction mixture neutral or alkaline. Buffer substances may be added in order to maintain a weakly alkaline reaction throughout the process as for example lithium or sodium borates or tertiary sodium phosphate. When working with emulsions, soaps or any other usual emulsifying agents may be employed provided they do not show an acid reaction or are neutralized before their application or in the reaction mixture.

The polymerization products obtained are hard and brittle or elastic to tension and bending or plastic depending on the specific vinyl ether employed and on whether for example styrene, vinyl chloride, acrylic nitrile or acrylic amide, which as such mainly give rather brittle po.ymerization products, or acrylic esters, which as such give elastic to rubber-like polymerization products, have been added.

The properties of the final products may be varied within wide limits by varying the proportions of the components. Thus polymerized styrene when po.ymerized in conjunction with vinyl ethers loses a great deal of its brittleness. By employing about molecular proportions of acrylic nitrile or of vinyl chloride and vinyl ethers, solid products are obtained which are solid at room temperature but are plastic when heated and which if desired after admixture with softening agents such as camphor, may be pressed, blown, injection-moulded and cut. By reason of their stability to light, the polmerization products according to this invention may also be employed as a binding agent for the manufacture of compound glass.

Depending on their physical properties, the resulting polymerization products may be worked up into films, threads, coatings, varnishes or lacquers, priming compositions and the like, or into insulating materials for the electrical industry, or together with fillers, fabrics and pigments into substitutes for oilcloth, linoleum, leather and the like. The mixed polymerization products obtained with vinyl ethers are distinguished by good resistance to becoming brittle in winter at temperatures below zero centigrade.

The additional materials, such as softening agents, fillers, pigments and the like, may, inter alia, be added before the polymerization provided they do not show an acid reaction.

By saponifying the polymerization products containing acrylic nitrile or acrylic chloride, water-soluble products are obtained which may be employed for example as dispersing, emulsifying, thickening, dressing, sizing and binding agents.

The following examples will further illustrate the nature of this invention but the invention is not restricted to these examples. The parts are by weight.

*Example 1*

30 parts of vinyl n-butyl ether, together with 70 parts of styrene are gradually heated from 130° to 150° C. during the course of 24 hours. A clear polymerization product which becomes soft when heated is obtained. It has considerably greater elastic properties than pure polymerized styrene and may be worked into moulded articles by injection-moulding while hot into cold moulds. By dissolving 20 parts of the polymerization product in a mixture of 40 parts each of xylene and toluene a composition is obtained which furnishes highly elastic, strongly adherent coatings on metal or wood. A white coating composition can be obtained by grinding 15 parts of the polymerization products with 10 parts of titanium white in a ball mill together with 25 parts of xylene and then diluting with 50 parts of a mixture of equal parts of xylene and toluene, the composition giving glossy, durable coatings which are fast to light. By combining a polymerization product from 20 parts of vinyl n-butyl ether, together with 80 parts of styrene with 5 parts of polymerized cyclohexanone 2 parts of lampblack and 78 parts of a mixture of equal parts of butyl acetate, toluene and xylene a composition is obtained which gives very glossy and hard coatings on wood or metal surfaces.

*Example 2*

60 parts of vinyl ethyl ether are mixed with 40 parts of acrylic nitrile and emulsified in 200 parts of water in which 1 part of Turkey red oil, 0.5 part of the sodium salt of iso-butyl naphthalene sulphonic acid and 3 parts of an aqueous 30 per cent hydrogen peroxide solution have been dissolved. The emulsion is heated in a closed vessel for 4 hours at from 90° to 100° C., and after coagulation by adding aqueous about 2 per cent hydrochloric acid yields a transparent elastic material which is hard when cold, soft when hot, and capable of being moulded by pressing, for example to combs. A blue covering lacquer can be prepared by mixing 20 parts of the polymerization product with 5 parts of Milori blue, 10 parts of barytes, 25 parts of ethyl acetate and 20 parts each of methyl acetate and of acetone.

*Example 3*

80 parts of vinyl n-butyl ether are mixed with 20 parts of acrylic nitrile, emulsified in 200 parts of the aqueous solution described in Example 2 and heated under a reflux condenser while stirring until the temperature of the mixture has risen to 90° C. A soft flexible material which may be readily pressed is obtained; it is suitable for example for insulating cables or wires or as an addition to lacquers for electrically insulating metal conductors. Such coating compositions may consist for example of 30 parts of the polymerization product, 50 parts of acetone, 20 parts of methyl acetate and 10 parts of toluene, the composition furnishing strongly adherent coatings which are fast to light. If desired 10 parts of the polymerization product may be replaced by nitro cellulose while substituting 5 parts of cyclohexyl acetate for 5 parts of the toluene.

*Example 4*

50 parts of vinyl n-butyl ether are mixed with 50 parts of acrylic nitrile and 2 parts of benzoyl peroxide and emulsified in 200 parts of water in which are dissolved 2 parts of Turkey red oil, 1 part of the sodium salt of iso-butyl naphthalene sulphonic acid, 3 parts of an aqueous 30 per cent hydrogen peroxide solution and 5 parts of the sodium salt of polymerized acrylic acid. The emulsion is heated until its temperature reaches from 90° to 95° C. and the reaction product is treated with steam to remove the last traces of monomeric organic compounds, coagulated with 5 parts of concentrated hydrochloric acid, washed with water and dried. The reaction product is rather hard and strong and considerably tensile when cold, plastic and capable of being pressed when hot and may be worked up in the same way as celluloid if desired in the presence of softening agents.

*Example 5*

A mixture consisting of 50 parts of vinyl ethyl ether and 300 parts of vinyl chloride, in which 1 part of benzoyl peroxide has been dissolved, is gradually introduced, while stirring, into a closed pressure-tight vessel at about 60° C. After from 12 to 24 hours, after the introduction has been finished, a white, pulverulent polymerization product is obtained, which is soluble in organic solvents, such as cyclohexanone, acetone, methylene chloride and their mixtures and may be employed as binding agent for the lacquer industry. The polymerization products according to this and to the foregoing example may be worked into covering lacquers by combining for example 10 parts of the polymerization products with 10 parts of nitrocellulose, 10 parts of lithopone, 5 parts of tricresyl phosphate, 35 parts of butyl acetate, 5 parts of butanol, 15 parts of ethyl acetate and 10 parts of toluene.

*Example 6*

60 parts of vinyl ethyl ether are mixed with 40 parts of acrylic nitrile and emulsified in 100 parts of water in which 1 part of Turkey red oil, 0.5 part of Marseilles soap and 2 parts of an aqueous 30 per cent hydrogen peroxide solution have been dissolved. The emulsion is heated in an enamelled stirring vessel provided with reflux condenser to from 90° to 100° C. in the course of from 5 to 8 hours, about 5 parts of vinyl ether being distilled off during the polymerization. The resulting emulsion is then broken by pouring it into about 1000 parts of an aqueous 2 per cent sulphuric acid solution. A white powder is obtained which is washed with water and may be moulded by heat-pressing whereby hard, elastic moulded articles are obtained.

Example 7

A mixture of equal parts of vinyl ethyl ether and acrylic nitrile is polymerized in the manner described in Example 6. The resulting polymerization product is then worked at room temperature with a concentrated aqueous hydrochloric acid solution until it is dissolved therein and ethyl alcohol is added, whereby flakes are obtained which are hard and tough after drying and which give clear, viscous solutions with aqueous solutions of caustic alkali which may be employed as dispersive, emulsifying, thickening, sizing or dressing agents or as binding media in leather or like varnishes.

Example 8

50 parts of the vinyl ether of ethylene glycol monoethyl ether are mixed with 50 parts of the methyl ester of acrylic acid and then 0.3 part of benzoyl peroxide is dissolved in the mixture. The mixture is emulsified, while vigorously stirring, in 300 parts of water containing 3 parts of lithium borate, 3 parts of oleyl methyl taurine, ($C_{17}H_{33}CO-N(CH_3)-C_2H_4-SO_3H$), 1.5 parts of isopropyl naphthalene sulphonic acid sodium salt, 3 parts of a 30 per cent aqueous hydrogen peroxide solution and 1 part of potassium persulphate. The emulsion is heated to boiling under a reflux condenser in a glass vessel or, preferably, in an enamelled vessel. At the beginning of the polymerization the temperature is from 75° to 80° C. and raises to about 95° C. towards the end. About 12 parts of non-polymerized monomeric vinyl ether are distilled off through a descending condenser. The polymerization product can be obtained from the remaining aqueous dispersion by coagulation by the addition of strong electrolytes such as aqueous mineral acids, common salt or caustic soda or by freezing out, washing and drying. The dried product is soluble in organic solvents, such as acetone, cyclohexanone or benzene, possesses a high tensile elasticity and is very suitable, on account of its stability to light and aging, with or without the additon of nitrocellulose or other binding agents used in the lacquer or varnish industries, for pale-colored coverings on elastic or tensile bases (leather, cotton fabrics, paper), for example for oilcloth, artificial leather, lacquers for insulated wires or cables and the like.

Example 9

A mixture consisting of 50 parts of the vinyl ether of ethylene glycol mono-ethyl ether and 50 parts of acrylic nitrile is polymerized as described in Example 8. The product is soluble in acetone, cyclohexanone and halogenated aliphatic hydrocarbons such as methylene or ethylene chlorides and furnishes elastic films from these solutions. It is very suitable, for example, as binding agent in the lacquer and varnish industry as a substitute for cellulose derivatives or drying oils.

What I claim is:—

1. In the production of polymerization products the step which comprises subjecting to polymerization a mixture of an ether corresponding to the formula $CH_2=CH-O-X$ wherein X is a radicle selected from the group consisting of saturated alkyl, cycloalkyl, aralkyl and the radicles of glycols and saturated mono alkyl ethers of glycols, with another neutral, polymerizable vinyl compound containing one aliphatic double linkage in a from neutral to alkaline medium.

2. In the production of polymerization products the step which comprises subjecting to polymerization a mixture of an ether corresponding to the formula $CH_2=CH-O-X$ wherein X is a radicle selected from the group consisting of saturated alkyl, cycloalkyl, aralkyl and the radicles of glycols and saturated mono alkyl ethers of glycols, with another neutral, polymerizable vinyl compound containing one aliphatic double linkage in a from neutral to alkaline, liquid diluent.

3. In the production of polymerization products the step which comprises subjecting to polymerization a mixture of an ether corresponding to the formula $CH_2=CH-O-X$ wherein X is a radicle selected from the group consisting of saturated alkyl, cycloalkyl, aralkyl and the radicles of glycols and saturated mono alkyl ethers of glycols, with another neutral, polymerizable vinyl compound containing one aliphatic double linkage in an aqueous medium having a hydrogen-ion concentration between pH=7 and pH=about 8.

4. In the production of polymerization products the step which comprises subjecting to polymerization a mixture of an ether corresponding to the formula $CH_2=CH-O-X$ wherein X is a radicle selected from the group consisting of saturated alkyl, cycloalkyl, aralkyl and the radicles of glycols and saturated mono alkyl ethers of glycols, with another neutral, polymerizable aliphatic mono-vinyl compound in a from neutral to alkaline medium.

5. In the production of polymerization products the step which comprises subjecting to polymerization a mixture of a vinyl saturated alkyl ether with another neutral, polymerizable vinyl compound containing one aliphatic double linkage in a from neutral to alkaline medium.

6. As new articles of manufacture, mixed polymerization products of an ether corresponding to the formula $CH_2=CH-O-X$ wherein X is a radicle selected from the group consisting of saturated alkyl, cycloalkyl, aralkyl and the radicles of glycols and saturated mono alkyl ethers of glycols, with another neutral, polymerizable vinyl compound containing one aliphatic double linkage.

7. As new articles of manufacture mixed polymerization products of an ether corresponding to the formula $CH_2=CH-O-X$ wherein X is a radicle selected from the group consisting of saturated alkyl, cycloalkyl, aralkyl and the radicles of glycols and saturated mono alkyl ethers of glycols with from 100 to 600 per cent of its weight of another neutral, polymerizable vinyl compound containing one aliphatic double linkage.

8. As new articles of manufacture mixed polymerization products of a vinyl saturated alkyl ether with from 100 to 400 per cent of its weight of another neutral, polymerizable vinyl compound containing one aliphatic double linkage.

9. As new articles of manufacture mixed polymerization products of a vinyl saturated alkyl ether with from 100 to 600 per cent of its weight of another neutral, polymerizable aliphatic mono-vinyl compound.

10. As new articles of manufacture mixed polymerization products of a vinyl saturated alkyl ether with from 100 to 600 per cent of its weight of vinyl chloride.

11. As new articles of manufacture mixed polymerization products of a vinyl saturated alkyl ether with from 100 to 600 per cent of its weight of acrylic nitrile.

12. As new articles of manufacture heat and pressure moulded mixed polymerization products of an ether corresponding to the formula $CH_2=CH-O-X$ wherein X is a radicle selected from the group consisting of saturated alkyl, cycloalkyl, aralkyl and the radicles of glycols and saturated mono alkyl ethers of glycols, with another neutral, polymerizable vinyl compound containing one aliphatic double linkage.

13. As new articles of manufacture coating compositions comprising mixed polymerization products of an ether corresponding to the formula $CH_2=CH-O-X$ wherein X is a radicle selected from the group consisting of saturated alkyl, cycloalkyl, aralkyl and the radicles of glycols and saturated mono alkyl ethers of glycols, with another neutral, polymerizable vinyl compound containing one aliphatic double linkage.

HANS FIKENTSCHER.